United States Patent [19]

Callaghan

[11] Patent Number: 5,937,397
[45] Date of Patent: Aug. 10, 1999

[54] SOCIAL LEARNING INFERENCING ENGINE FOR INTELLIGENT AGENT ENVIRONMENT

[75] Inventor: Patrick Callaghan, Vestal, N.Y.

[73] Assignee: International Business Machines Corporation, Armonk, N.Y.

[21] Appl. No.: 08/827,683

[22] Filed: Apr. 10, 1997

[51] Int. Cl.$^6$ .............................. G06F 15/16; G06F 17/30; G06F 19/00
[52] U.S. Cl. ................................. 706/10; 706/11
[58] Field of Search ........................................ 706/10, 11

[56] References Cited

U.S. PATENT DOCUMENTS 5,583,763  12/1996  Atcheson et al. ............................ 707/3

FOREIGN PATENT DOCUMENTS

643359-A2  3/1995  European Pat. Off. ........ G06F 17/30
751471-A1  1/1997  European Pat. Off. ........ G06F 17/60
7-234881   9/1995  Japan .............................. G06F 17/30

OTHER PUBLICATIONS

N.J. Davies, Information Agents For The World Wide Web, BT Technology Journal, vol. 14, No. 4, pp. 105–114, Oct. 1996 (data base printout).

Tak Woon Yan et al., From User Access Patterns To Dynamic Hypertext Linking, Computer Network ISDN System (Netherlands), vol. 28, No. 7–11, pp. 1007–1014, May 1996 (data base printout).

B. Sheth and P. Maes, "Evolving Agents for Personalized Information Filtering," Proc. Ninth Conf. on Artificial Intelligence for Applications, pp. 345–352, Mar. 1993.

Y. Lashkari, et al., "Collaborative Interface Agents," Proc. Twelfth National Conf. on Artificial Intelligence, vol. 1, pp. 444–449, Jul. 1994.

P. Resnick, "GroupLens: an open architecture for collaborative filtering of netnews," Proc. Conf. on Computer Supported Cooperative Work, pp. 175–186, Dec. 1994.

W. Hill, et al., "Recommending and evaluating choices in a virtual community of use," Conf. Proc. on Human factors in computing systems, pp. 194–201, Dec. 1995.

(List continued on next page.)

Primary Examiner—Robert W. Downs
Attorney, Agent, or Firm—Whitham, Curtis & Whitham; Arthur J. Samodovitz

[57] ABSTRACT

A social learning inferencing engine for a wide range of information searching applications is generally applicable to a wide range of applications due to the engine's interfaces and the objects involved in these interfaces. The basic interfaces are a record of a user's score of a object, a count of the number of times a user references an object, and a prediction of a user's score of a object given the user has not previously scored the object. The scores of this user and other users strongly similar or strongly dissimilar to this user for this object and other objects strongly similar or strongly dissimilar to this object are used in making this prediction. The two central object classes in the system are the users and the objects. The user object class contains member fields that identify the user, specify configuration values specific to this user (these configuration values being used in predicting the scores of the objects for this user), and links to objects that the user has scored or referenced. The object class contains member fields that identify the object and links to user objects that have scored or referenced this object.

10 Claims, 12 Drawing Sheets

OTHER PUBLICATIONS

D. Maltz and K. Ehrlich, "Pointing the way: active collaborative filtering," Conf. Proc. on Human factors in computing systems, pp. 202–209, Dec. 1995.

U. Shardanand and P. Maes., "Social information filtering: algorithms for automating "word of mouth"," Conf. Proc. on Human factors in computing systems, pp. 210–217, Dec. 1995.

D.E. Rose, et al., "MessageWorld: a new approach to facilitating asynchronous group communication," Proc. Int'l. Conf. on Information and Knowledge Management, pp. 266–273, Dec. 1995.

S. Hiraiwa and Y. Kohda, "Info–Plaza: A Social Information Filtering System for the World–Wide Web," Proc. 1996 Int'l. Conf. on Parallel and Distributed Systems, pp. 10–15, Jun. 1996.

B. Starr, et al., "Do–I–Care: A Collaborative Web Agent," Proc. Conf. Companion on Human factors in computing systems: Common Ground, pp. 273–274, Apr. 1996.

SOCIAL LEARNING INFERENCING ENGINE FOR INTELLIGENT AGENT ENVIRONMENT

BACKGROUND OF THE INVENTION

1. Field of the Invention

The present invention generally relates to computer artificial intelligence (AI) implemented as an inferencing engine and, more particularly, to such inferencing engines used to identify frequently visited objects in a distributed data base by a plurality of diverse users. The invention has particular application to predicting user preferences of web pages and links on the Internet using the World Wide Web (WWW).

2. Background Description

The Internet is a collection of networks that allows users at disparate, heterogeneous computer systems to communicate with each other across organizational and geographical boundaries. The Internet uses a packet switched protocol referred to as the Transmission Control Protocol/Internet Protocol (TCP/IP). Full Internet access usually includes five key features; electronic mail (e-mail), logging on to Internet-connected computers using Telnet, transferring files from Internet-connected computers using File Transfer Protocol (FTP), getting access to discussion groups, and using various information-research tools, especially the World Wide Web (WWW).

The World Wide Web is a hypertext-based information service that makes collections of information available across the Internet. It allows Web browser clients to access information from any accessible Web server and supports multiple media types. The World Wide Web can be used to invoke other software by means of embedded hypertext links. Hypertext Markup Language (HTML) is used to describe static text documents, and a Web browser is essentially an HTML interpreter. A Uniform Resource Locator (URL) is basically a network location which tells the user not only where something is (its address), but also what it is. The basic form of a URL address is service://hostname/path which identifies what Internet service is needed to reach the resource, what computer it is located on, and enough detail to find what is being searched for.

With the explosion of information on the World Wide Web, it is difficult for users to find information that is important to them and to avoid encountering information that is not important.

Embedded hypertext links on a given Web page can be used to find information related to the given Web page. By clicking on a hypertext link in one Web page, the user can display another related Web page or even invoke a related program. The problem is that there is no indication of which of these links are important to a user based on the user's specific interests and which are not important. What is needed is a way for all Web hypertext links presented to a user to be scored (i.e., rated) as they are presented. The scoring would be based on the interests of the user and would indicate to what degree they will like or dislike the link.

In addition, since there is a very large number of Web pages already on the World Wide Web and many more are being added every day, it is impossible for a user to keep up with what Web pages are important to them. To alleviate this problem, there are Web pages, often sponsored by businesses, which provide a list of "recommended" Web pages. Often these lists contain Web pages that most users already know about. In addition, the recommendations are for the public in general and once again, are not tailored to the specific interests of a given user. What is needed is a list to be presented which is tailored to a given user and contains Web pages that user has not yet displayed.

The need for such a system could have potential application to other large distributed databases which are not necessarily part of the Internet. For example, large corporate or governmental databases might be more efficiently used with such lists tailored to a specific user's interest.

SUMMARY OF THE INVENTION

It is therefore an object of the invention to provide an inferencing engine which predicts how much a user will like or dislike something (call it a widget).

It is another object of the invention to provide a tool which creates a list of things (i.e. widgets) that are predicted to be liked by a given user.

It is yet another and more specific object of the invention to provide a World Wide Web Automated Collaboration System (WACS) which provides, as a user "surfs" the Web, recommendations of URLs to go to from each displayed page and which URLs to avoid.

According to the invention, there is provided a social learning inferencing engine for a wide range of information searching applications. What makes the social learning engine generally applicable to a wide range of applications are the engine's interfaces and the objects involved in these interfaces.

The basic interfaces are a record of a user's score of an object, a record of a user referencing the object, and a prediction of a user's score of a object given the user has not previously scored the object. The scores of this user and other users strongly similar or strongly dissimilar to this user for this object and other objects strongly similar or strongly dissimilar to this object are used in making this prediction.

The two central object classes in the system are the users and the objects. The user object class contains member fields that identify the user, specify configuration values specific to this user (these configuration values being used in predicting the scores of the objects for this user), and links to objects that the user has scored or referenced. Associated with these links are the actual scores given by the user for the objects, optional comments made by the user while specifying the scores, and the number of references made by the user to the objects. The object class contains member fields that identify the object and links to user objects that have scored or referenced this object. Once again, associated with these links are the actual scores given by the users, optional comments made by the user while specifying the scores, and the number of references made by the users. These scores and reference counts are the same scores and reference counts associated with the links from the user objects. They are shared between the two objects so as to minimize the memory required to hold this information.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a flow diagram of the process to record the score of a "widget" by a user, FIG. 2 is a flow diagram of the process to increment the number of references that a user has made to a "widget", FIGS. 3A to 3D, taken together, is a flow diagram of the process to predict the score that a user would give a "widget" based on what the social learning engine has learned about the given use and other users, FIG. 4 is a flow diagram of the process of calculating how similar all other users are to a given user, and FIG. 5 is a flow diagram of the process of calculating how similar all other "widgets" are to a given "widget"; FIG. 6 is a flow diagram of the process of predicting what Web links, on a Web page displayed by a user, will be strongly liked or strongly disliked by the user and indicate these to the user, FIG. 7 is a flow diagram of the process for suggesting Web link(s) or URL(s) to a user that the user has not seen and may like, FIG. 8 is a flow diagram of the process of recording if a user likes or dislikes a given URL, and FIG. 9 is a flow diagram of the process of recording a user displaying a URL.

DETAILED DESCRIPTION OF A PREFERRED EMBODIMENT OF THE INVENTION

In the following description, the term "object" is referred to as a "widget". The specific object will vary depending on the data base in which it is used. In a specific application described with reference to FIGS. 6 to 9, the data base is the World Wide Web, and the "widgets" or objects are URLs. In a corporate data base, the "widgets" might be, for example, files. In any case, the social learning inferencing engine according to the invention is implemented as an application running on a server in the data base system. As such, the application is privy to the information about the different users having access to the server and which "widgets" the various users are accessing.

Figure 1:
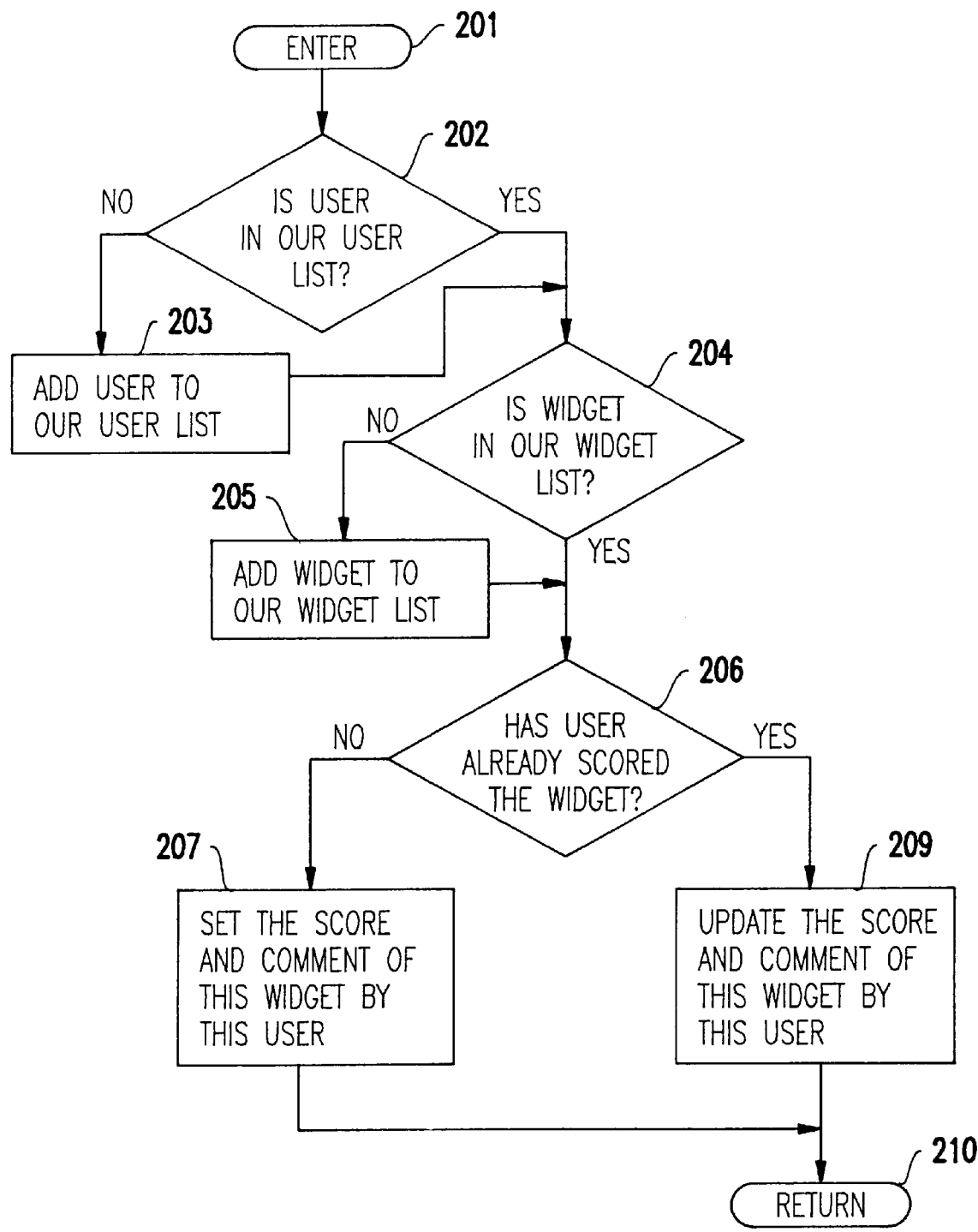
FIGS. 1, 2, 3, 4, and 5 are flow diagrams of the main routines that comprise the social learning inferencing engine according to the invention and, more particularly.

Referring now to the drawings, and more particularly to FIG. 1, there is shown the routine used to set the score of a "widget" by a user. The score is any value within a range of values where the range of values has been previously set for the system (i.e., the range of values is common for all users and not different per user). In addition, a comment or note can be associated with the score.

For the purpose of this description, the user for which the score is to be recorded will be called "the input user" and the widget scored will be called "the input widget". The routine is entered at step 201. The routine first determines, at step 202, if the social learning inferencing engine knows anything about the input user (i.e., is the input user in the user list maintained by the engine). If the input user is unknown, then the user is added to the user list at step 203. The same thing is done for the input widget at steps 204 and 205. Steps 206 through 209 store the input user's score and the associated comment given to this routine as the user's score of the input widget. Any score and comment previously saved for the input widget by the input user is replaced. The routine returns at step 210.

Figure 2:
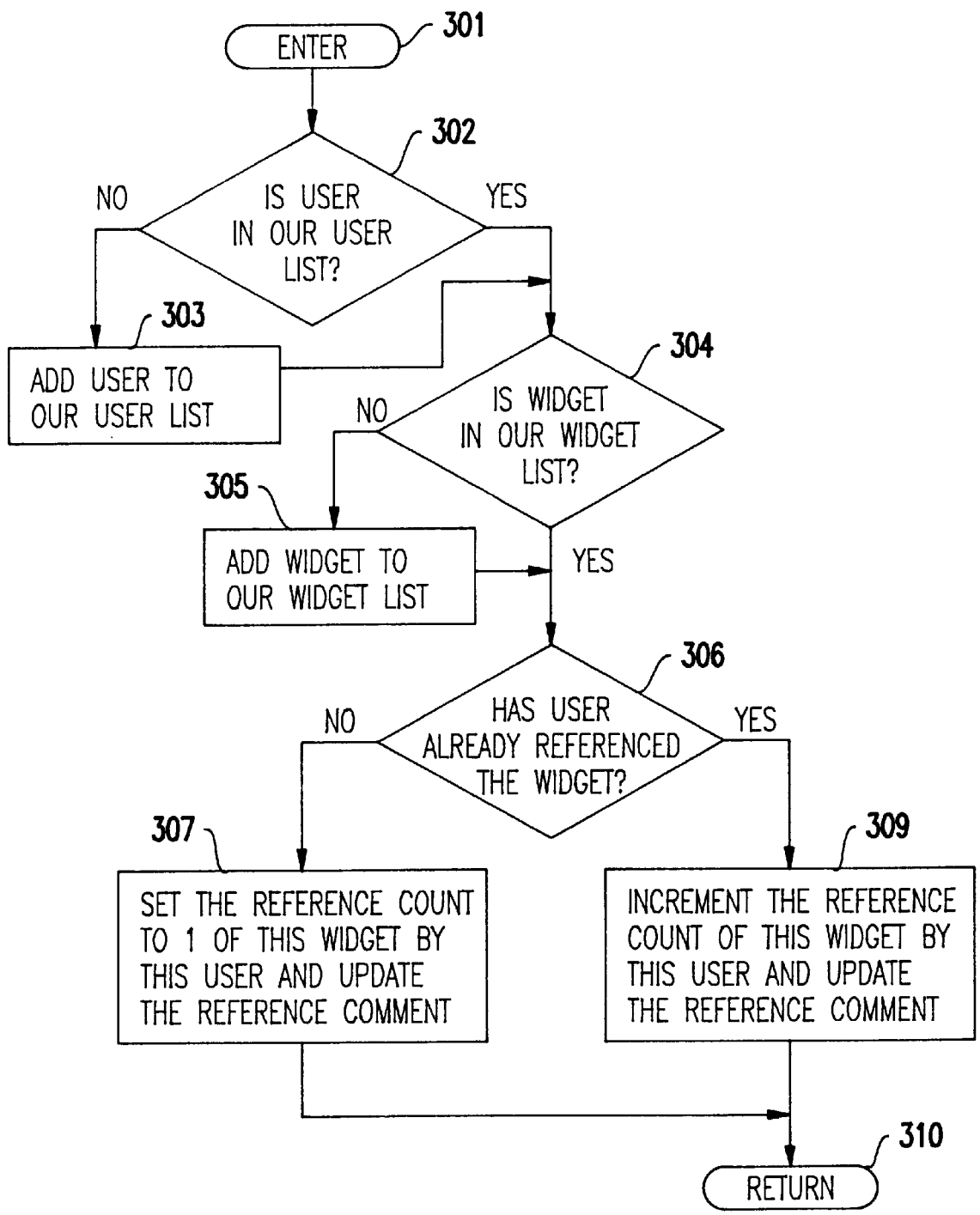

The routine in FIG. 2 is used to increment the number of references that a user has made to a widget. In addition, a comment or note can be associated with the reference.

For the purposes of this discussion, the user for which the reference count is to be incremented will be called "the input user" and the widget will be called "the input widget". The routine is entered at step 301. The routine first determines, at step 302, if the social learning inferencing engine knows anything about the input user (i.e., is the input user in the user list maintained by the engine). If the input user is unknown, then the user is added to the user list at step 303. The same thing is done for the input widget at steps 304 and 305. Steps 306 through 309 increment the reference count and change the optional reference comment currently stored for the input widget by the input user. If this is the first reference of the input widget by the input user, the reference count is set to one instead of being incremented. The routine returns at step 310.

The routine in FIGS. 3A to 3D is used to predict the score that a user would give a widget based on what the social learning inferencing engine has learned about the given user and other users. The information learned is the scores given by the various users to the various widgets and what widgets have been referenced by what users and how often. The score returned is within the same range for which scores have been set for various widgets by various users. For example, if the social learning inferencing engine has been configured, at a system level, by an application to allow scores of −2 to +2 to be set for widgets, then the score returned will also be within this range.

Figure 3A:
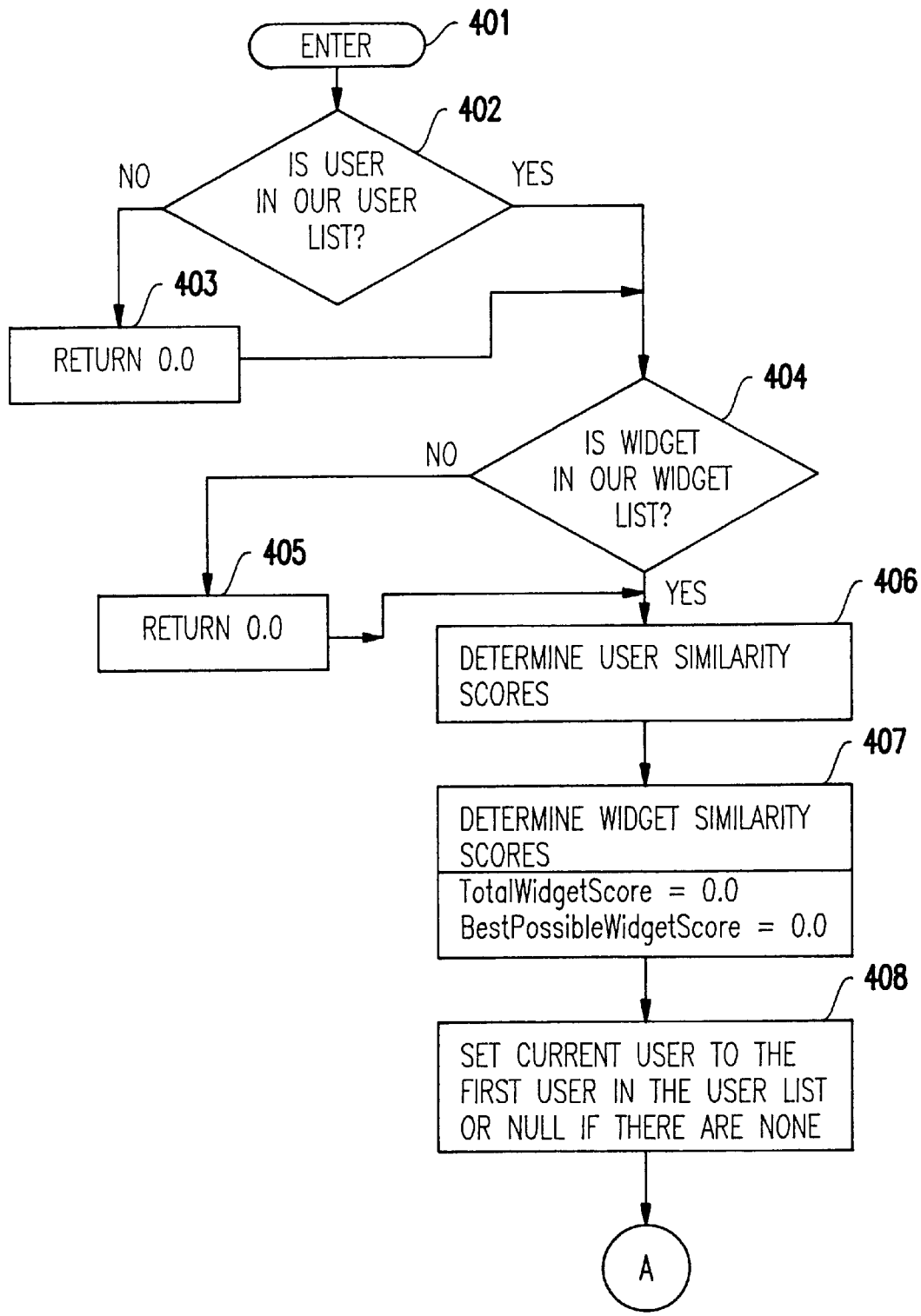

For the purposes of this description, the user for which the score is to be predicted will be called "the input user" and the widget will be called "the input widget". Referring first to FIG. 3A, the routine is entered in step 401. The routine first determines if the social learning inferencing engine has learned anything about the input user or input widget, at steps 402 and 404, respectively. If nothing is known about either, then a score of 0.0 is returned in steps 403 and 405, respectively. If something is known, then a similarity score is calculated in step 406 for each user known to the social learning engine. The similarity score is a measure where the user is not the input user. The similarity score is a measure of how similar the user is to the input user. The calculation uses the routine illustrated in FIG. 4 and described below and called at step 406. Similarly, a similarity score is calculated for each widget in step 407 known to the social learning inferencing engine. The similarity score is a measure where the widget is not the input widget. The similarity score is a measure of how similar the widget is to the input widget. The calculation uses the routine illustrated in FIG. 5 and described below and called at step 407. For efficiency, the calculations called at steps 406 and 407 do not have to be performed for every user and every widget if the calculations have been done recently. These recent results, or a subset of them, can be used as an option. In step 408, the current user is set to the first user in the user list or NULL if there are no other users in the list.

Figure 3B:
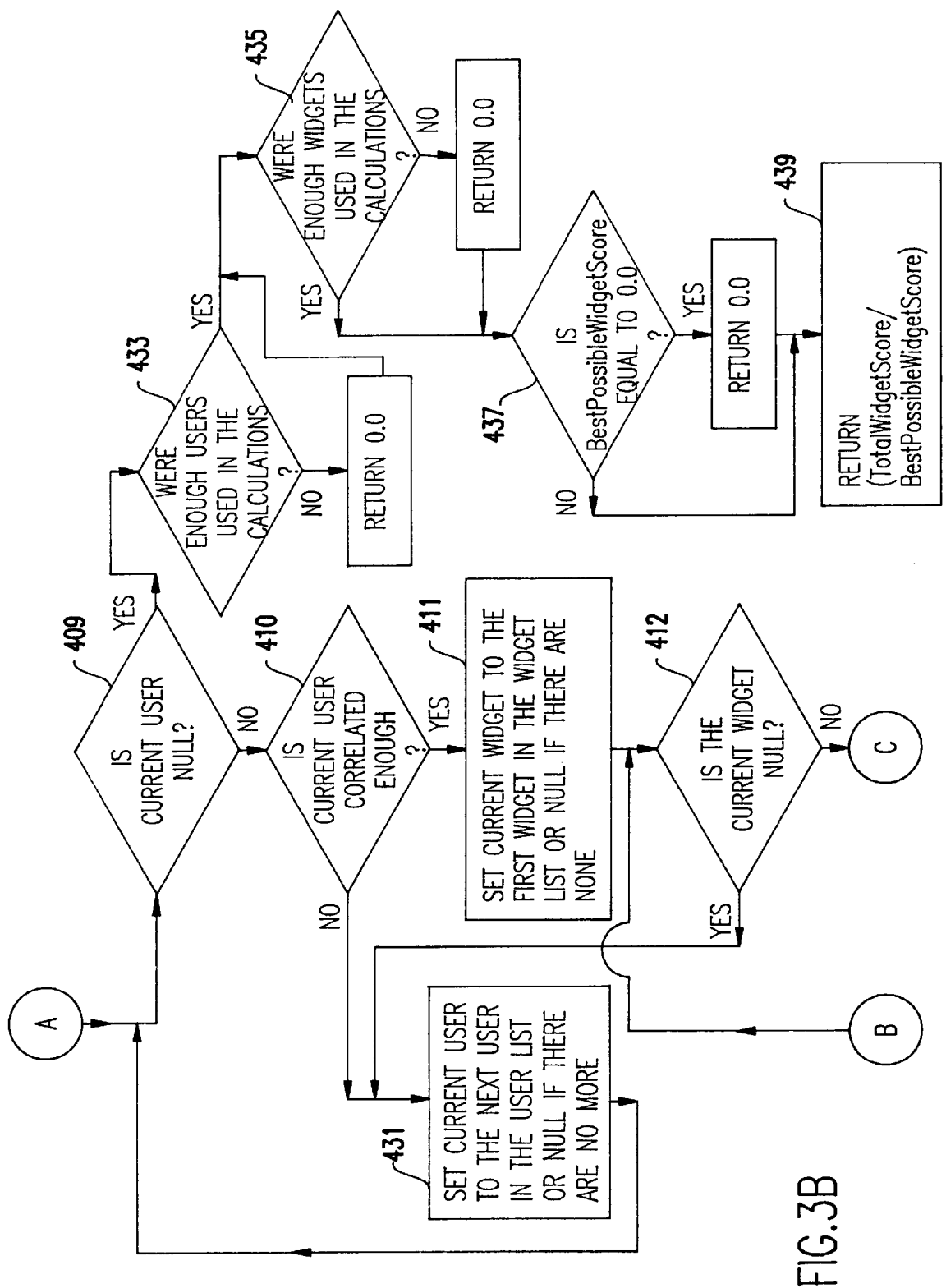

Referring next to FIG. 3B, Steps 409 through 431 represent two loops with one nested inside the other. The outer loop loops through every user known to the engine. Specifically, in step 409, a test is made to determine if the current user is NULL. If not, a test is made in step 410 to determine if the current user is correlated enough and, if not, the current user is set to the next user in the user list in step 431 before looping back to step 409.

The inner loop loops through every widget known to the engine. Specifically, if the current user is correlated enough in step 410, the current widget is set to the first widget in the widget list, or NULL if there are none, in step 411. A test is made in step 412 to determine if the current widget is NULL, and if so, the process goes to step 431; otherwise, the processing of the inner loop continues.

Between the outer loop and inner loop is step 410 which controls whether or not the inner loop is performed. The inner loop is only performed if the current user is correlated enough to the input user. The determination of whether or not the correlation is enough is defined by each user, in this case, by the input user. For example, the input user may only want the engine to use the scores of users who have a correlation value of 0.9 and greater or 0.1 and lower. The correlation is a range from 0 to 1 with 0 being completely dissimilar, 1 being completely similar, and 0.5 being neither similar nor dissimilar. Similarly, the input user can specify what correlation is enough by providing a minimum confidence level. For example, the input user may only want the engine to use the scores of users who are correlated (positively or negatively) within the 90% confidence level.

Figure 3C:
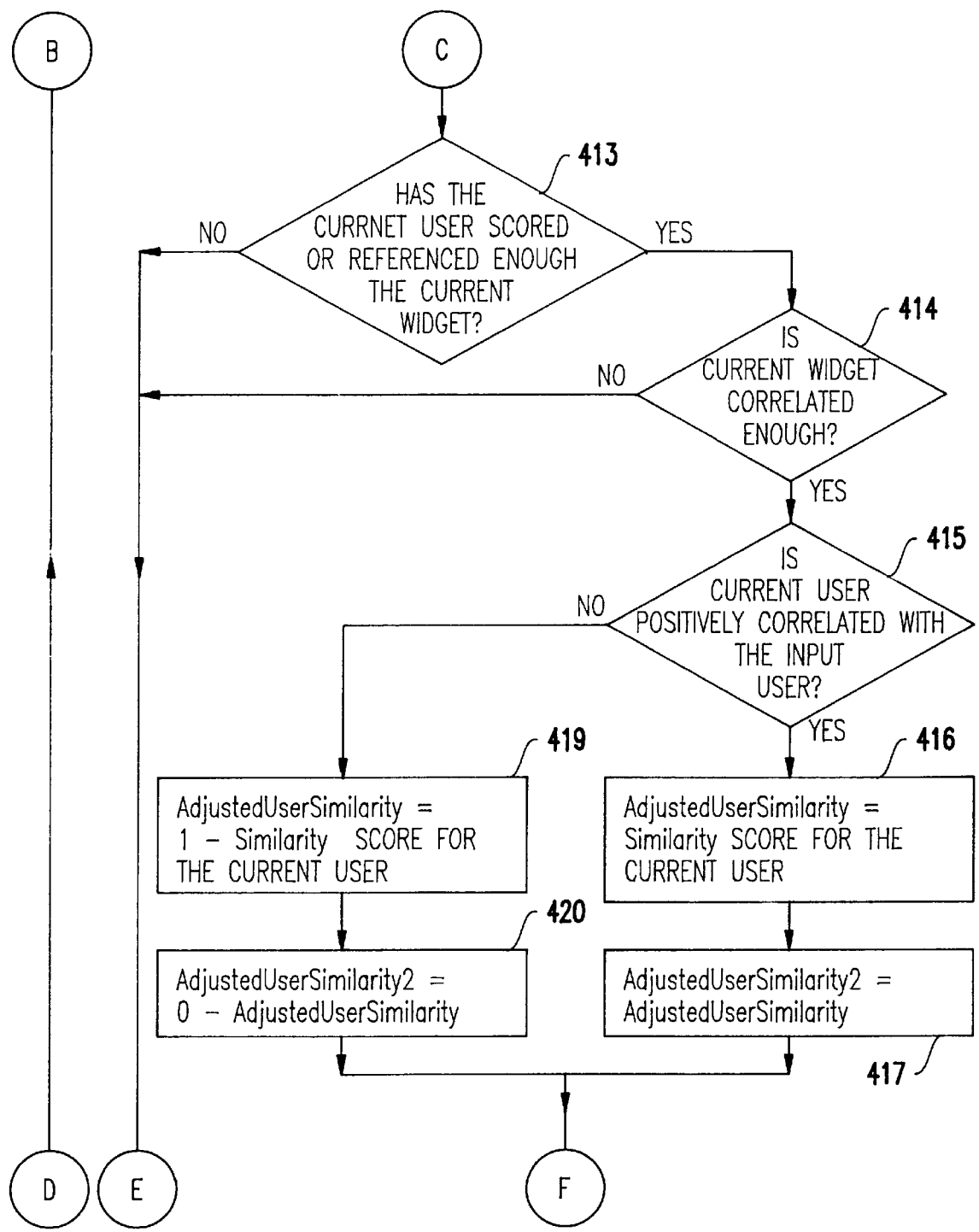

Referring next to FIG. 3C, inside the inner loop, further tests are performed to narrow down which widgets are used in the calculations. Step 413 ensures that only widgets scored or widgets referenced enough number of times by the current user of the outer loop are used. Step 414 ensures that only widgets correlated enough to the input widget are used where "enough" is once again defined by the input user.

A test is made in step 415 to determine if the current user is positively correlated with the input user. If so, the process goes to step 416, but if not, the process goes to step 419. Steps 416 through 428 perform the calculations. More particularly, in step 416, AdjustedUserSimilarity is set equal to Similarity score for the current user, and in step 417, AdjustedUserSimilarity2 is set equal to AdjustedUserSimilarity. In step 419, AdjustedUserSimilarity is set equal to 1 minus the similarity score for the current user, and in step 420, AdjustedUserSimilarity2 is set equal to 0 minus the AdjustedUserSimilarity.

Figure 3D:
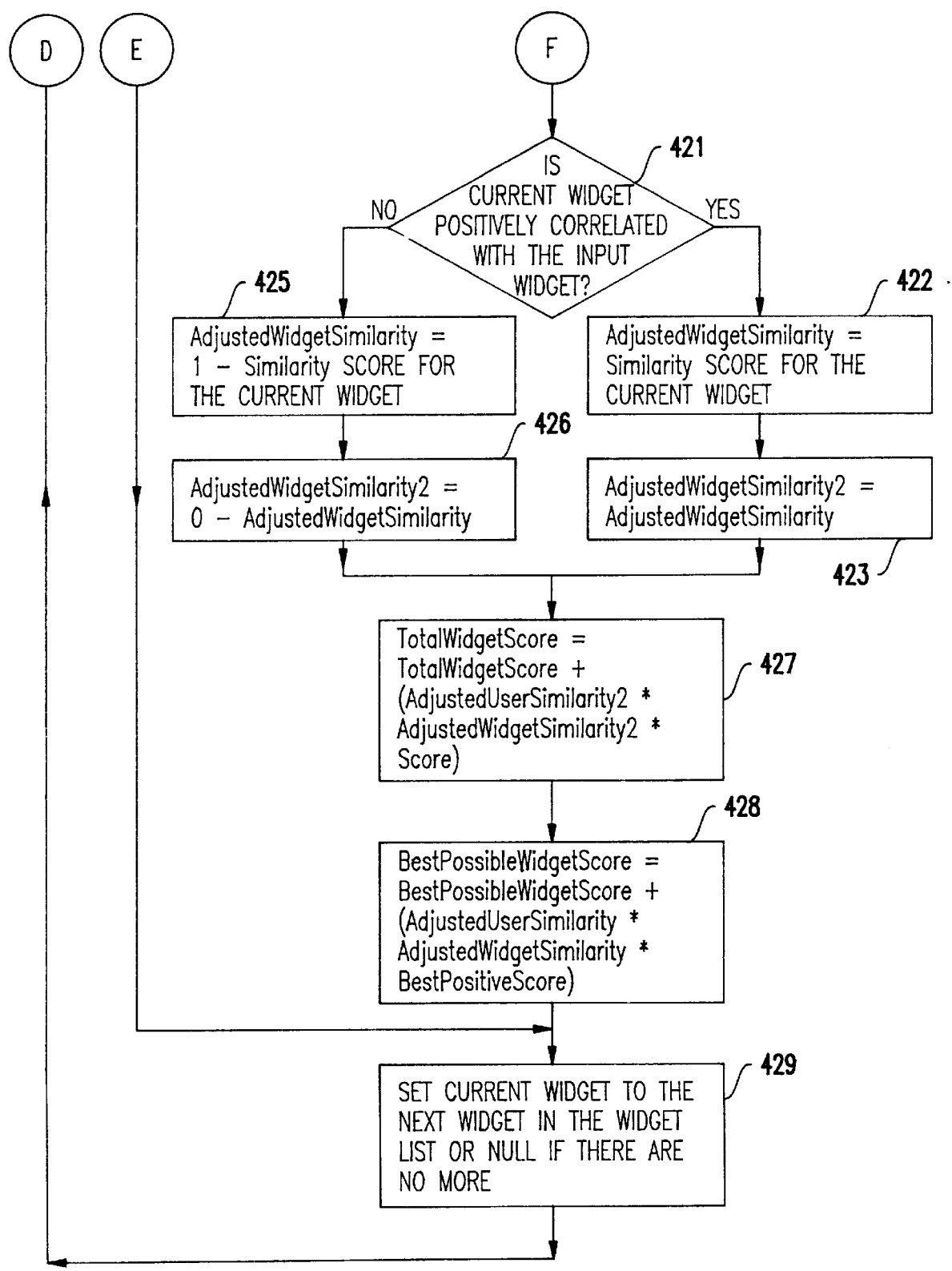

Next, as shown in FIG. 3D, a test is made in step 421 to determine if the current widget is positively correlated with the input widget. If so, the process goes to step 422, but if not, the process goes to step 425. In step 422, AdjustedWidgetSimilarity is set to the similarity score of the current widget, and in step 423, AdjustedWidgetSimilarity2 is set equal to AdjustedWidgetSimilarity. In step 425, AdjustedWidgetSimilarity is set equal to 1 minus the similarity score for the current widget, and in step 426, AdjustedWidgetSimilarity2 is set equal to 0 minus AdjustedWidgetSimilarity.

Now, in step 427, a calculation is made for the TotalWidgetScore as TotalWidgetScore+(AdjustedUserSimilarity2× AdjustedWidgetSimilarity2×Score). Next, in step 428, a calculation is made for the BestPossibleWidgetScore as BestpossibleWidgetScore+(AdjustedUserSimilarity× AdjustedWidgetSimilarity×BestPositiveScore).

Note that both strong similarities of users and widgets and strong dissimilarities of users and widgets are used. Also, although not shown explicitly in the calculations of steps 427 and 428, this engine can allow for more correlated users and widgets to be exponentially weighted. The calculations shown weigh more correlated users and widgets linearly. In addition, the calculations of steps 427 and 428 can use the NumberOfWidgetsBothUsersRated and the NumberOfUsersWhoRatedBothWidgets returned in steps 406 and 407, respectively.

At the completion of the calculations of steps 427 and 428, the current widget is set to the next widget, or to NULL if there are no more, in step 429. The process then loops back to step 412 in FIG. 3B.

Referring back to FIG. 3B, step 433 is performed after the outer loop is exited. This step and step 435 ensure that enough users and widgets were used by the engine in the calculations. Once again, enough is defined by the input user. Finally, if enough users and widgets have been used in the calculations, then the predicted score is returned at step 439. Note, step 437 exists to avoid a possible problem of dividing by 0 in step 439. The input user can provide feedback on the resulting prediction which is in turn used by the inferencing engine to adjust the predictions made for the input user.

Figure 4:
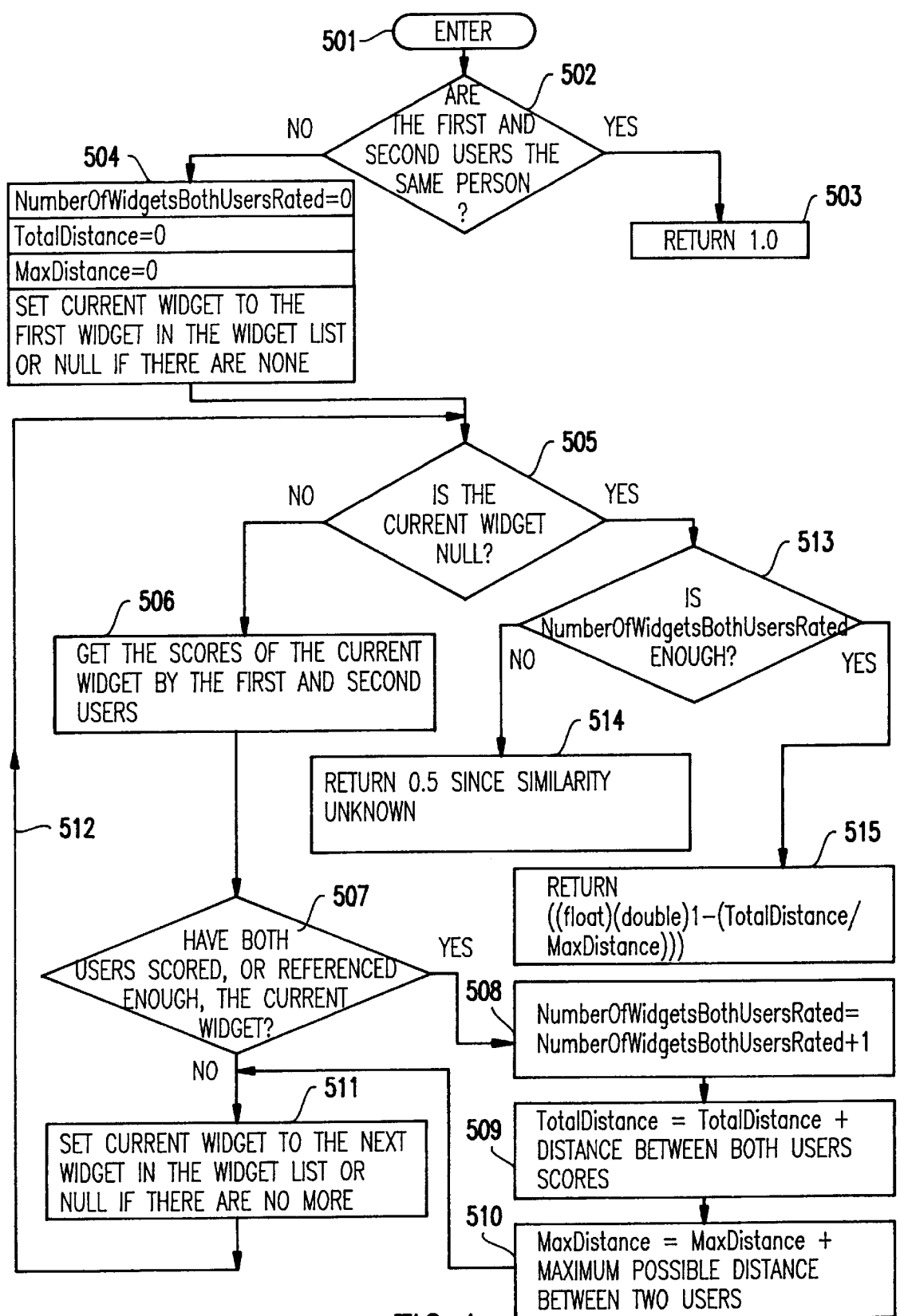

The routine in FIG. 4 is used to calculate how similar a given user is to another. The determination is based on what the social learning inferencing engine has learned about the two users and other users. The information learned is the scores given by the various users to the various widgets and what users have referenced what widgets and how often. The value returned is in the range of 0 to 1 where 0 indicates complete dissimilarity and 1 indicates complete similarity. This routine is used by step 406 of FIG. 3A as described above.

For the purpose of this description, one user will be called "the first user" and the other user will be called "the second user". The routine is entered at step 501. Step 502 is used to determine if the first and second users are the same. If they are, then the process need not go any further since it is known that the two users are completely similar (i.e., 1.0 is returned). Otherwise, steps 504 through 511, which represent a loop, are performed. The loop loops through each widget known to the engine. A test is made in step 505 to determine if the current widget is NULL. If not, the scores of the current widget by the first and second users is retrieved in step 506. A test is made in step 507 to determine if both users scored, or referenced enough, the current widget. For each widget that both the first and second users have either scored or referenced enough number of times, calculations are performed.

These calculations are at steps 508 through 510. The social learning inference engine creates a vector of scores for each of the two users and supports various methods for evaluating the similarity of the two vectors. These methods are known as "similarity measures" in the field of statistics. Which method is used by the social learning inferencing engine in making predictions for the input user is determined by the input user. The WACS application described in this invention, represented by the flow diagrams in FIGS. 6 through 9, uses the "Minkowski r Metric" similarity measure and the user specifies the r-value. The Minkowski r Metric with an r-value of 1 is known as the Hamming distance or city-block distance. The Minkowski r Metric with an r-value of 2 is also known as the Euclidean distance.

After the calculations are performed, or if the test in step 507 is negative, the current widget is set to the next widget in the widget list or to NULL if there are no more widgets in step 511. The process then loops back to step 505.

After the loop is exited, a test is performed at step 513 to ensure that enough widgets were scored or referenced enough by both the first and second user where enough is defined by the user for which this routine is being called. If enough were, then the similarity value is returned in step 515, as one minus the actual distance between the scores divided by the largest theoretical distance between the scores; otherwise, a value of 0.5 is returned in step 514, since the similarity is unknown. In either case, the NumberOfWidgetsBothUsersRated is also returned to the user.

Figure 5:
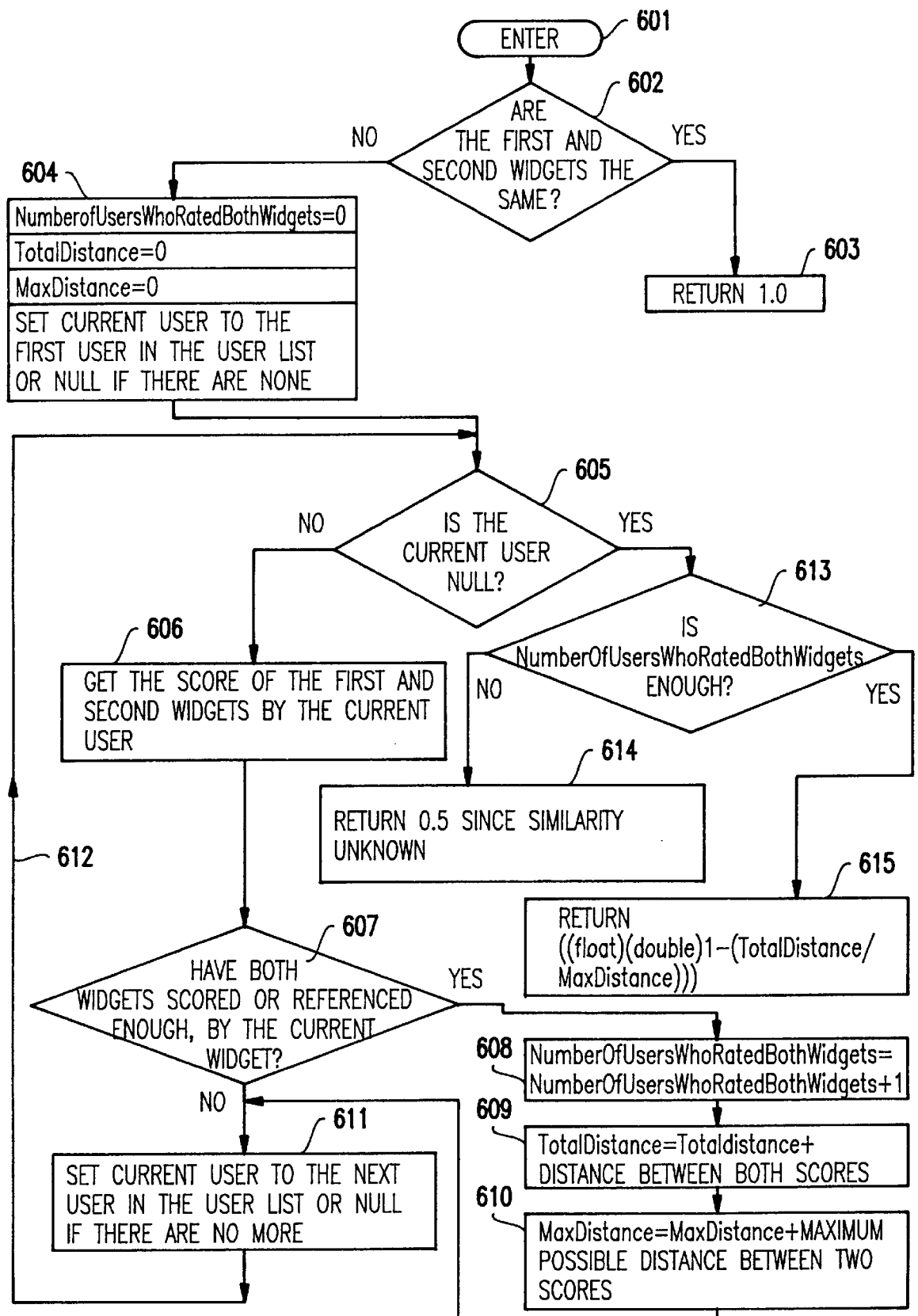

The routine of FIG. 5 is used to calculate how similar a given widget is to another. The determination is based on what the social learning engine has learned about the two widgets and other widgets. The information learned is the scores given by the various users to the various widgets and what users have referenced what widgets and how often. The value returned is in the range of 0 to 1 where 0 indicates complete dissimilarity and 1 indicates complete similarity. This routine is used by step 407 of FIG. 3A as described above.

For the purpose of this description, one widget will be called "the first widget" and the other widget will be called "the second widget". The routine is entered in step 601. The routine is basically the same as the routine described in FIG. 4 above except that the loop, at steps 604 through 611, iterates through all users instead of all widgets as is the case in FIG. 4, and only users who have scored or referenced enough number of times both the first and second widgets are used in the calculations instead of only widgets scored or referenced enough by both the first and second users as is the case in FIG. 4. Another difference is that the routine in FIG. 5 returns the NumberOUsersWhoRatedBothWidgets whereas the routine in FIG. 4 returns the NumberOfWidgetsBothUsersRated.

Exemplary configuration values within the user object class are as follows:

1) Threshold that determines how correlated another user must be to this user before the other user is used in predicting whether or not this user will like a widget. For example, if this threshold is 0.9 then only users with a correlation value greater than 0.9 or less than −0.9 are used. Note, this configuration value is normalized to a value between 0 and 1 when used at step 410 of FIG. 3B.

2) Threshold that determines how correlated another widget must be to the widget, for which a score is being predicted, before the other widget is used in the prediction. For example, if this threshold is 0.9 then only widgets with a correlation value greater than 0.9 or less than −0.9 are used. Note, this configuration value is normalized to a value between 0 and 1 when used at step 414 of FIG. 3C.

3) Minimum number of users required to have explicitly scored two widgets or implicitly referenced both widgets enough (see configuration value 7 below for what enough means) before the two widgets can be considered correlated. For example, if this configuration value is set to 10, then at least ten users must have scored (or implicitly referenced enough) both widgets of a pair of widgets, before the two widgets are considered correlated for the purpose of predicting the score of a widget for this user.

4) Minimum number of widgets required to have been explicitly scored or implicitly referenced enough (see configuration value 7 below for what enough means) by two users before the two users can be considered correlated. For example, if this configuration value is set to 10, then at least 10 widgets must have been scored (or implicitly referenced enough) by both users, of a pair of users, before the two users are considered correlated.

5) Minimum number of users that must be found correlated to this user before any predictions can be made for this user.

6) Minimum number of widgets that must be found correlated to a widget before a prediction can be made for the score of the widget for this user.

7) Minimum number of references, by this or another user, to a widget that is required before an implicit score is derived and used in predicting widget scores for this user. For example, if this configuration value is 4, then if a user references a widget 4 times or more and the user has not explicitly scored the widget, an implicit score is derived. This implicit score is used just like as if the user had specified an explicit score of the same value. The value of the implicit score is a configuration value that has been specified within the range of valid explicit scores.

8) The confidence level (i.e. statistical significance) that only strongly correlated users were used in predicting whether or not this user will like a specific widget. This configuration value is mutually exclusive with configuration value 1 since it is a different way of expression the same concept.

9) The confidence level (i.e. statistical significance) that only strongly correlated widgets were used in predicting whether or not this user will like a specific widget. This configuration value is mutually exclusive with configuration value 2 since it is a different way of expression the same concept.

10) Maximum number of users required to have explicitly scored two widgets, or implicitly referenced both widgets enough, before the widgets can be considered correlated. This configuration value is associated with configuration value 3 which specifies the minimum. If more than the maximum number of users scored or referenced enough both widgets then the most correlated users, up to the maximum number, are used.

11) Maximum number of widgets required to have been explicitly scored, or implicitly referenced enough, by two users before the two users can be considered correlated. This configuration value is associated with configuration value 4 which specifies the minimum. If more than the maximum number of widgets are scored or referenced enough by both users then the most correlated widgets, up to the maximum number, are used.

12) Specification of how much more weight is given to more correlated users than less correlated users when making predictions for this user. The default is that the weight is proportional to the correlation value. The value will be specified as an exponent.

13) Specification of how much more weight is given to more correlated widgets than less correlated widgets when making predictions for this user. The default is that the weight is proportional to the correlation value. The value will be specified as an exponent.

14) Specification of how long scores given by this user for widgets and implicit references to widgets are retained. For example, if this configuration value is specified as 6 months then scores or references by this user are erased after they are 6 months old and therefore not used in any ensuing predictions for this user.

All of the configuration values above control the "safeness" of predictions made for the user. Therefore, a user has significant control over how aggressive he or she wants the social learning engine to be in making predictions for them. All the configuration values have a default value if the user does not specify one.

Another attribute of the flexibility of the engine is the fact that the range of scores is specified as a system configuration value. For example, the application that would use this engine could decide that the valid range of scores that will ever be allowed is from −2 to +2 (for a total of 5 different scores). Therefore, users could only specify a score for a widget that falls within this range (of −2 to +2) and predicted scores would also only fall within this range. Some other applications may only have scores of "good", "neutral" or "bad" and need three separate scores. The application would decide the valid range of scores.

Although mentioned above, it is worth repeating that this "social learning" engine uses the combination of both user correlations and widget correlations when making score predictions. The intersection of the correlations are used. In other words, only the scores of the most correlated widgets by the most correlated users are used in the calculations. By using both the most correlated users and widgets, the chances of making a good prediction are increased over using just the. most correlated users or the most correlated widgets.

Finally, mentioned above is the fact that dissimilarity relationships, in addition to similarity relationships, are used in predicting scores. For example, if the engine finds that one widget is largely the opposite of another (in terms of the scores that users give it), then this information is used. If during the processing of predicting the score of a widget (called the input widget) by a user (called the input user), a widget is found which is the opposite of the input widget and the users similar to the input user strongly dislike this widget, then this provides evidence that the input user will strongly like the input widget.

Having described the social learning inferencing engine according to the invention, a specific application of the engine according to the invention to the selection of Web links on the World Wide Web (WWW) will now be described. The inferencing engine runs on a Web proxy server as a plug-in application. A Web proxy server plug-in application is an application which registers itself with the Web proxy server and indicates that it would like to be passed information about the user's requests that go through this Web proxy server.

Any users who access the World Wide Web through the Web proxy server allow the inferencing engine to read and modify the data that flows between the user's Web browser application and the World Wide Web. Included in this information is what URLs the user is displaying via their browser.

In addition, to being able to record what URLs different users are displaying, by being a Web proxy server plug-in, the inferencing engine can use the proxy security function provided in the Hypertext Transfer Protocol (HTTP) 1.1. Through this security, users are prevented from displaying the information learned by this engine about other users.

This specific application is referred to herein as the World Wide Web Automated Collaboration System (WACS). WACS makes recommendations to a user of URLs to go to from each displayed page as the user "surfs the Web". WACS also recommends which URLs to avoid. The recommendations are based on what WACS has learned about the user (i.e., what URLs the user likes or dislikes) and how this compares to what WACS has learned about other WACS users. To use WACS, the user must have a Web browser that supports the proxy authorization support of HTTP 1.1. Examples of such Web browsers are Netscape Navigator for Windows95 (v.3.0) and Microsoft Internet Explorer for Windows95 (v.3.01).

Figure 6:
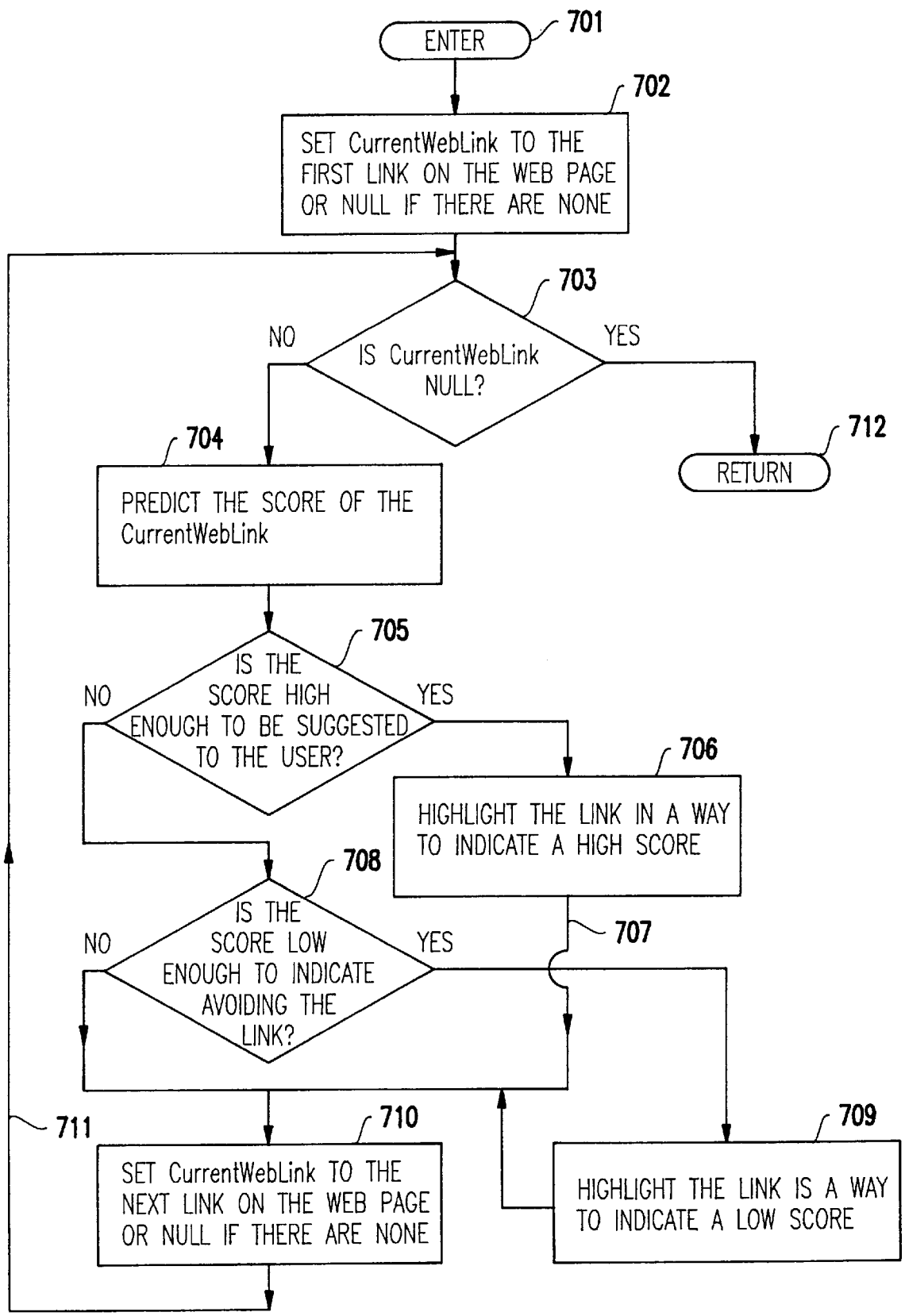
FIGS. 6, 7, 8, and 9 are flow diagrams of the main routines that comprise the inferencing engine for selection of Web links and, in particular.

The routine in FIG. 6 is used to predict what Web links on a Web page displayed by a user will be strongly liked or strongly disliked by the user and to indicate these to the user.

For the purposes of this description, the user for which the prediction will be made will be called "the input user" and the Web page to be examined will be called "the input Web page". The routine is entered at step 701. Steps 702 through 711 comprise a loop which loops through each Web link. (i.e., URL) on the input Web page. For each Web link encountered, a prediction is made as to how much the input user will like the link. This prediction, at step 704, is made using the social learning inferencing engine; specifically, the routine illustrated in FIGS. 3A–3D and described above. If the score returned at step 704 is high enough or low enough, then the Web link is highlighted on the Web page. High scores are highlighted in step 706 in a way to indicate to the user that they will like the link, and low scores are highlighted in step 709 in a way to indicate to the user that they will dislike the link. The individual user, in this case, the input user, specifies the thresholds that define what scores are high enough and which are low enough. The tests for scores being high enough or low enough are performed at steps 705 and 708, respectively. The routine returns at step 712.

Figure 7:
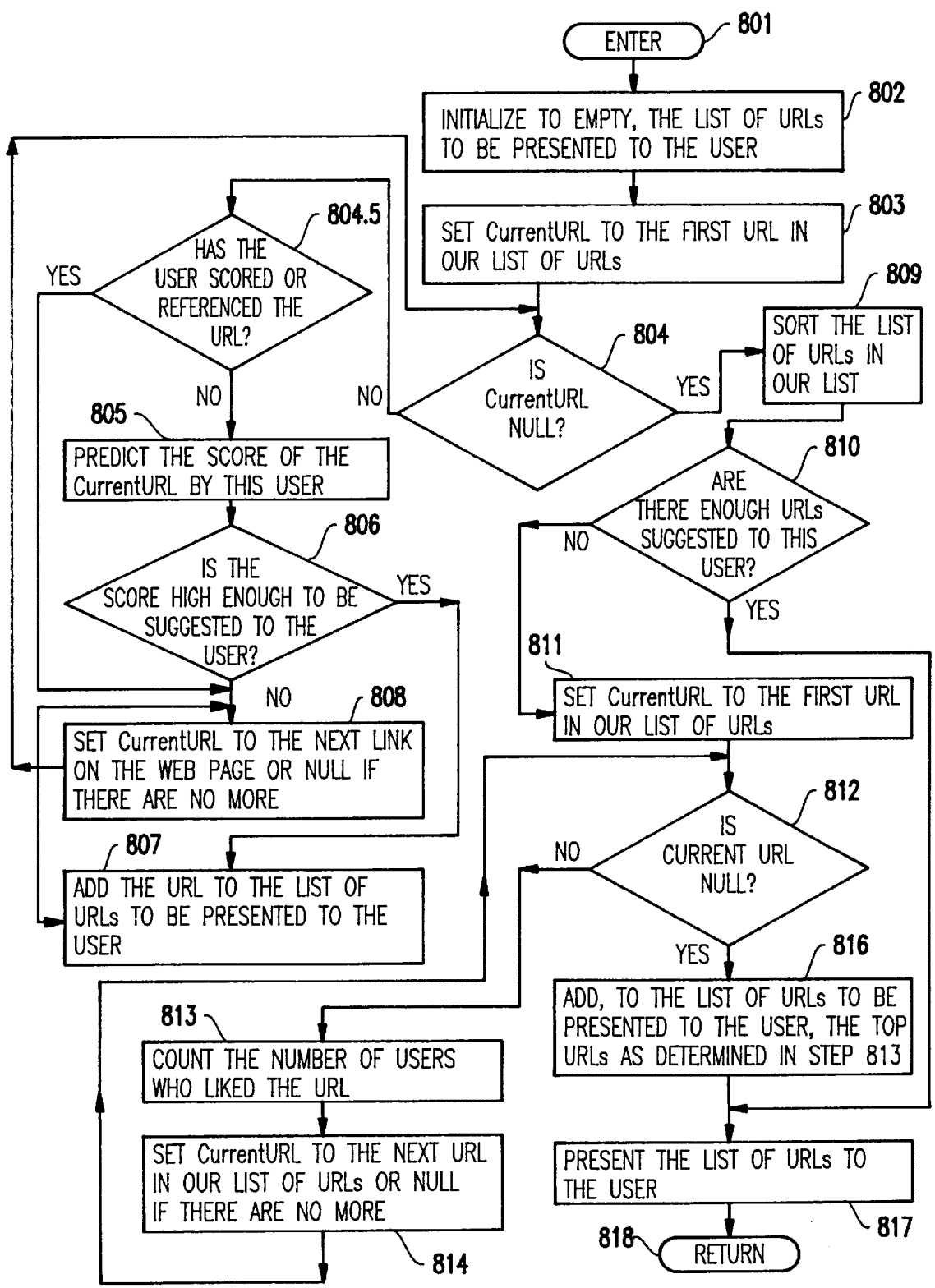

The routine in FIG. 7 is used to suggest Web link(s) (URL(s)) to a user that the user has not seen and may like. For the purpose of this description, the user for which the suggestion(s) will be made will be called "the input user". The routine is entered at step 801. The routine creates a list of Web links to present to the user. This list is initialized to an empty list at step 802. Steps 803 through 808 comprise a loop which loops through each Web link that this engine has learned about through processing the routines shown in FIGS. 8 and 9 as described below. For each Web link encountered in the loop, a prediction is made as to how much the input user will like the link. This prediction, at step 805, is made using the social learning inferencing engine described above with reference to FIGS. 3A–3D. If the score returned at step 805 is high enough, then the link is added, at step 807, to the list that was initialized at step 802; otherwise, the current URL is set to the next link on the Web page, or NULL if there are no more URLs to process, in step 808. As was the case for the routine shown in FIG. 6, the individual user, in this case the input user, specifies the threshold that defines what scores are high enough. The process then loops back to step 804 to continue processing URLs.

Step 809 is executed after the loop is exited (i.e., there are no more Web links to predict scores for). This step sorts the list of Web links in descending order based on the score returned at step 805. Step 810 checks to make sure that enough Web links have been added to the input user's suggestion list. Once again, the input user decides what the minimum number of URLs is to suggest.

If there are not enough Web links in the list, then another loop is performed by using steps 811 through 814. This loop, like the loop at steps 803 through 808, loops through each Web link that this engine has learned about. For each Web link, a count is calculated in step 813 which represents how many users known to this engine have explicitly given the Web link a score of 1 (indicating that they like the Web link) or have displayed (i.e., referenced) the Web link enough number of times (i.e., they have displayed the Web link enough to predict that they liked the Web link). Only users with the same occupation or other characteristic identifier as the input user are considered.

At completion of the loop, the Web links with the highest counts are added to the suggestion list for the input user at step 816. The number of Web links added is based on what the user has specified as the minimum number of Web links that they would like to see in the list. This is the same value that was used in step 810 above. At step 817, the list of Web links is presented to the user. The routine returns at step 818.

Figure 8:
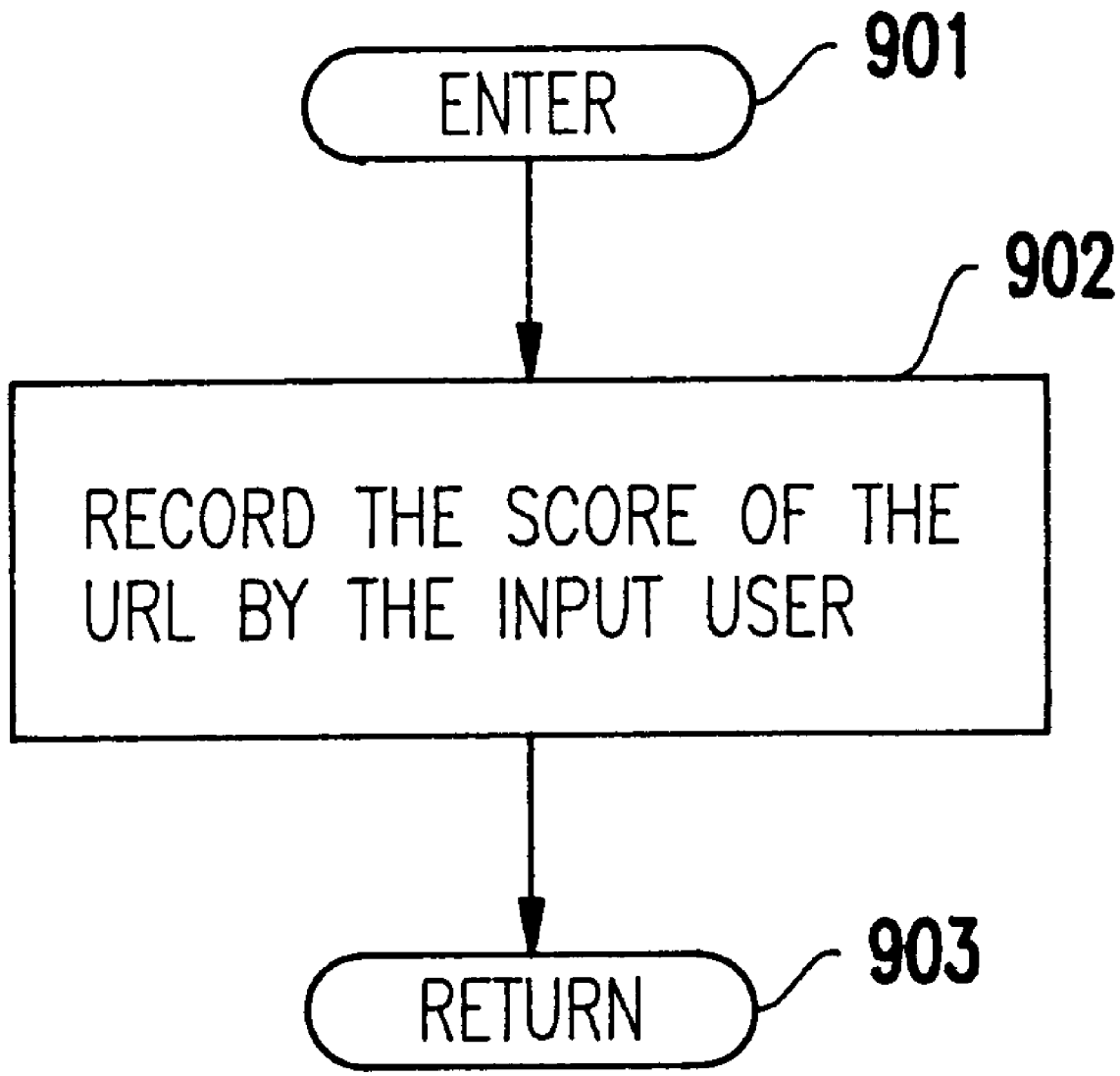

The routine in FIG. 8 is used to record if a user likes or dislikes a given Web link (URL). For the purpose of this description, the user for which the opinion is recorded will be called "the input user", and the URL will be called "the input Web link". The routine is entered at step 901. The routine uses the social learning engine described above with reference to FIG. 1 to record the score. The routine returns at step 903.

Figure 9:
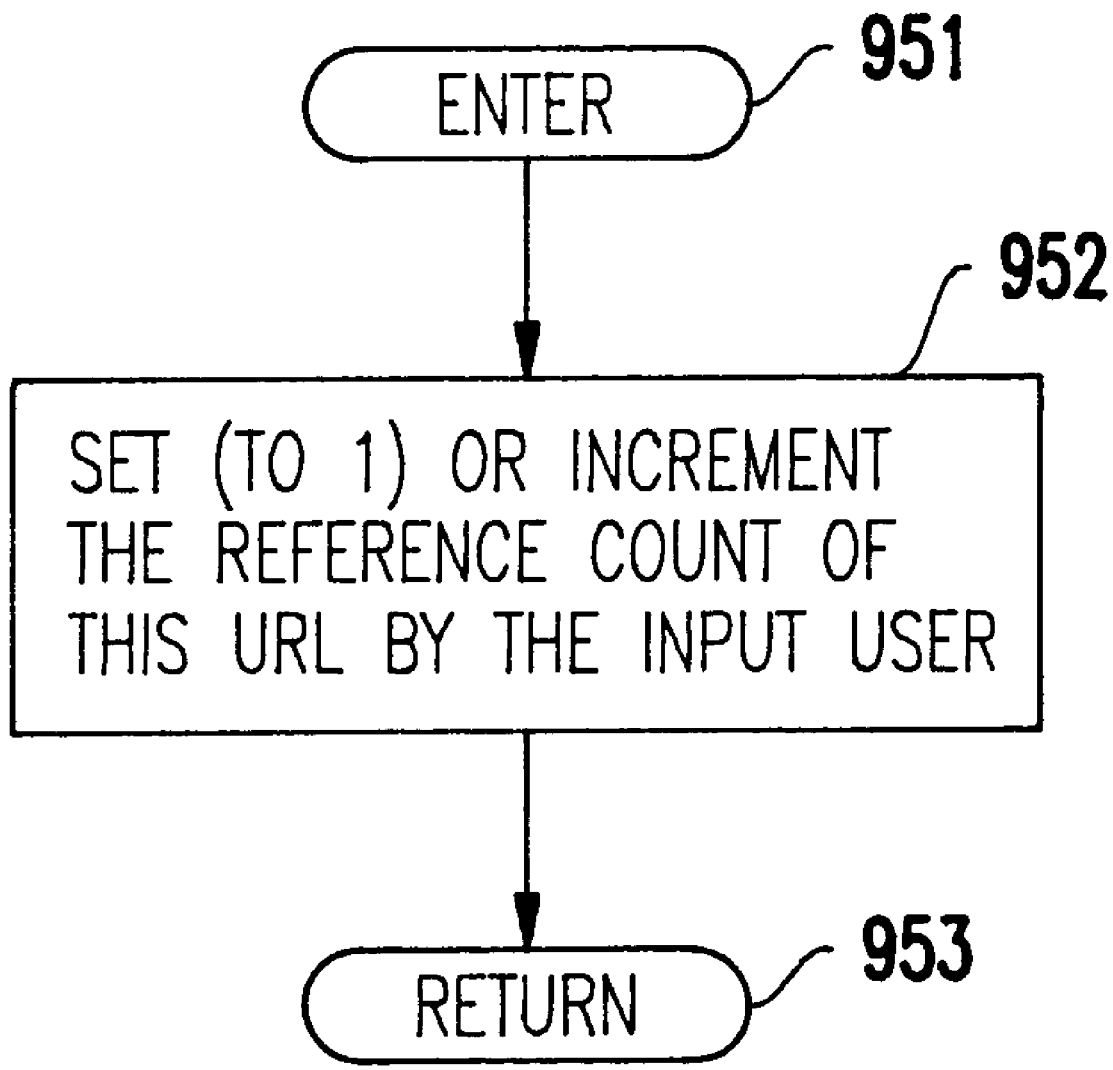

The routine in FIG. 9 is used to record the event of a user displaying (i.e., referencing) a URL. For the purpose of this description, the user doing the displaying will be called "the input user", and the URL will be called "the input Web link". The routine is entered at step 951. The routine at step 952 uses the social learning engine illustrated in FIG. 2 and described above. The routine returns at step 953.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A social learning inferencing engine implemented as a computer process on a distributed data base to predict a user's score for objects on the distributed data base, said process comprising the steps of:

establishing a user class containing member fields that identify the user, specify configuration values specific to the user, and links to objects that the user has scored or referenced;

establishing an object class containing member fields that identify an object and links to user objects that have scored or referenced the object;

associating user object links to actual scores given by the user for the objects, a comment given by the user and associated with the score, and a number of references made by the user to the objects;

calculating similarity measures for each user class to every other user class and similarity measures for each object class to every other object class based on the scores and the number of references associated with the user object links;

using the similarity measures of the user classes and the similarity measures of the object classes to predict a score that the user would give the object; and displaying objects to the user that have a predicted score above a threshold set by the user.

2. The social learning inferencing engine implemented as a computer process on a distributed data base recited in claim 1 further comprising the step of allowing the user to assign scores for objects displayed.

3. The social learning inferencing engine implemented as a computer process on a distributed data base recited in claim 2 wherein the scores assignable by the user are within a predefined range.

4. The social learning inferencing engine implemented as a computer process on a distributed data base recited in claim 3 wherein the predefined range includes negative scores and the step of predicting includes predicting negative scores.

5. The social learning inferencing engine implemented as a computer process on a distributed data base as recited in claim 1 wherein the distributed data base is the Internet, and the computer process is a proxy application on a server in the Internet.

6. The social learning inferencing engine implemented as a computer process on a distributed data base as recited in claim 5 wherein the objects are Uniform Resource Locators (URLs) on the World Wide Web (WWW).

7. The social learning inferencing engine implemented as a computer process on a distributed data base recited in claim 6 further comprising the step of allowing the user to assign scores for URLs displayed.

8. The social learning inferencing engine implemented as a computer process on a distributed data base recited in claim 7 wherein the scores assignable by the user are within a predefined range.

9. A social learning inferencing engine implemented as a computer process on a distributed data base to predict a user's score for objects on the distributed data base, said process comprising the steps of:

establishing a user class containing member fields that identify the user, specify configuration values specific to the user, and links to objects that the user has scored or referenced;

establishing an object class containing member fields that identify an object and links to user objects that have scored or referenced the object;

associating user object links to actual scores given by the user for the objects, a comment given by the user and associated with the score, and a number of references made by the user to the objects;

calculating similarity measures for each user class to every other user class and similarity measures for each object class to every other object class based on the scores and the number of references associated with the user object links;

using the similarity measures of the user classes and the similarity measures of the object classes to predict a score that the user would give the object;

displaying objects to the user that have a predicted score above a threshold set by the user, wherein the distributed data base is the Internet, and the computer process is a proxy application on a server in the Internet, wherein the objects are Uniform Resource Locators (URLs) on the World Wide Web (WWW) allowing the user to assign scores for URLs displayed; and highlighting URLs displayed by the user that have a predicted score higher or lower than thresholds set by the user.

10. A social learning inferencing engine implemented as a computer process on a distributed data base to predict a user's score for objects on the distributed data base, said process comprising the steps of:

establishing a user class containing member fields that identify the user, specify configuration values specific to the user, and links to objects that the user has scored or referenced;

establishing an object class containing member fields that identify an object and links to user objects that have scored or referenced the object;

associating user object links to actual scores given by the user for the objects, a comment given by the user and associated with the score, and a number of references made by the user to the objects;

calculating similarity measures for each user class to every other user class and similarity measures for each object class to every other object class base on the scores and the number of references associated with the user object links;

using the similarity measures of the user classes and the similarity measures of the object classes to predict a score that the user would give the object;

displaying objects to the user that have a predicted score above a threshold set by the user, wherein the distributed data base is the Internet, and the computer process is a proxy application on a server in the Internet, wherein the objects are Uniform Resource Locators (URLs) on the World Wide Web (WWW) allowing the user to assign scores for URLs displayed, wherein the scores assignable by the user are within a predefined range, and wherein the predefined range includes negative scores and the step of predicting includes predicting negative scores.

\* \* \* \* \*